United States Patent [19]

Whitehead

[11] Patent Number: 5,243,506
[45] Date of Patent: Sep. 7, 1993

[54] HIGH ASPECT RATIO LIGHT EMITTER HAVING HIGH UNIFORMITY AND DIRECTIONALITY

[75] Inventor: Lorne A. Whitehead, Vancouver, Canada

[73] Assignee: TIR Systems Ltd., Burnaby, Canada

[21] Appl. No.: 716,684

[22] Filed: Jun. 17, 1991

[51] Int. Cl.⁵ .................................................. F217 7/00
[52] U.S. Cl. ..................................... 362/307; 362/31; 362/299; 362/300; 362/339; 359/641
[58] Field of Search ............... 362/32, 31, 299, 300, 362/329; 359/629, 641, 640, 639, 638

[56] References Cited

U.S. PATENT DOCUMENTS

| | | | |
|---|---|---|---|
| 4,335,421 | 6/1982 | Modia et al. | 362/97 |
| 4,791,540 | 12/1988 | Dreyer, Jr. et al. | 362/31 |
| 4,996,632 | 2/1991 | Aikens | 362/32 |
| 5,016,143 | 5/1991 | Aikens | 362/32 |
| 5,043,850 | 8/1991 | Dreyer, Jr. | 362/32 |
| 5,054,885 | 10/1991 | Melby | 362/307 |

FOREIGN PATENT DOCUMENTS 0713529 8/1954 United Kingdom ............... 362/301

*Primary Examiner*—Ira S. Lazarus
*Assistant Examiner*—L. Heyman
*Attorney, Agent, or Firm*—Chernoff, Vilhauer, McClung & Stenzel

[57] ABSTRACT

A light emitter for emitting partially collimated light in one or more selected directions. The light emitter has a longitudinally specularly reflective internal surface; and, a light emitting area having an inner portion which is both partially longitudinally specular reflective and partially longitudinally transmissive and, a refractive, prismatic outer portion.

14 Claims, 4 Drawing Sheets

HIGH ASPECT RATIO LIGHT EMITTER HAVING HIGH UNIFORMITY AND DIRECTIONALITY

FIELD OF THE INVENTION

This application pertains to light distribution from a single source into a comparatively large structure which redirects the light so that it is emitted from the structure in a restricted direction through a large emitting area in such a manner that an observer perceives uniform light distribution over the entire emitting area.

BACKGROUND OF THE INVENTION

A high aspect ratio light distribution structure is one in which the size of the structure's light emitting area is large compared to a characteristic cross-sectional width of the structure. Such structures commonly have a single localized light source.

Examples of this concept are light guiding systems based on prism light guide material as described in U.S. Pat. Nos. 4,260,220; 4,615,579; and, 4,787,708 (Whitehead); or, metallic light guides as described in U.S. Pat. No. 4,105,293 (Aizenberg et al). Such prior art light guides have predominantly reflective interior surfaces. Accordingly, light rays entering one end of the guide are reflected by the guide's inner walls as the rays proceed to the other end of the guide. Such prior art light guides are designed to "leak" light in a controlled manner, such that the amount of light emitted from the guide per unit length is acceptably uniform along the entire length of the guide.

Although such prior art light guides are very useful for general light distribution purposes, they do not perform well in situations in which it is desirable to have light emitted within a narrowly restricted range of angles from a large light emitting area, while maintaining highly uniform light distribution over the entire light emitting area. Examples of situations in which such characteristics are desirable include linear navigational beacons, which preferably emit maximum light intensity in a substantially horizontal direction; certain backlit liquid crystal displays, which preferably emit light only within a desired range of viewing angles; and, certain vehicle signal lights, which preferably emit maximum light intensity only in desired directions. In each situation it is necessary to efficiently restrict the emitted light to a desired direction, while maintaining highly uniform light distribution over the entire light emitting surface. The present invention satisfies these requirements and thus facilitates the construction of highly directional, highly uniform, high aspect ratio light emitters.

SUMMARY OF THE INVENTION

In accordance with the preferred embodiment, the invention provides a light emitter for emitting partially collimated light in one or more selected directions. The light emitter incorporates a partially collimated light source, a longitudinally specularly reflective internal surface, and a light emitting area having a fractionally longitudinally specular reflective, fractionally longitudinally transmissive inner portion and, a refractive, prismatic outer portion.

The degree of longitudinal transmissivity of the inner portion is varied as a selected function of position on the inner portion to control the distribution of emitted light. The transmissivity variation is such that the quantity of light per unit area transmitted by the inner portion has a predetermined distribution of values as a function of position on the outer surface of the inner portion. Advantageously, the distribution of values may be substantially uniform.

If the light emitting area is curved, then the angular distribution of the emitted light will be different at different locations. Accordingly, the transmissivity may be varied to yield a predetermined variation of total luminous intensity as a function of the direction of the emitted light. Again, the transmissivity variation may be such that the distribution of values is substantially uniform, or it may have some other useful distribution. For example, the distribution in which the total luminous intensity of the emitted light varies as $1/\cos^2\theta$ may be used to attain uniform illumination of a plane surface in an indirect ceiling lighting application. As another example, the distribution in which the total luminous intensity of the emitted light is substantially uniform within a selected range of the angle $\theta$, and substantially zero outside that range, may be used to confine the effective illumination of a navigational beacon to a selected angular range.

In many applications, the prismatic outer portion of the light emitting area can be configured such that light incident at any particular point on the inside surface of the outer portion is redirected into a direction substantially perpendicular to the outer portion at the particular point.

DETAILED DESCRIPTION OF THE PREFERRED EMBODIMENT

Figure 1A:
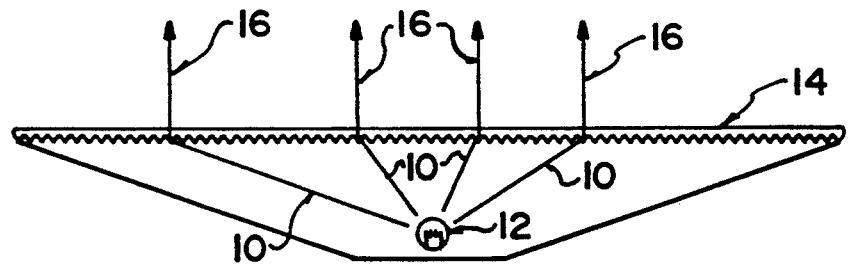
FIGS. 1A, 1B and 1C illustrate prior art techniques for distributing light from a single source within a comparatively large structure which redirects the light so that it escapes in a restricted direction through a large emitting area.

Various prior art attempts have been made to construct high aspect ratio light emitters capable of distributing light from a single source in such a manner that light is emitted in a restricted direction over a large light emitting area. For example, FIG. 1A shows a technique as disclosed in U.S. Pat. No. 4,755,921 (Nelson) and in U.S. Pat. No. 4,337,759 (Popovich et al). Light emanating in arbitrary directions 10 from light source 12 is redirected by fresnel lens 14 in such a way that the light emitted from fresnel lens 14 is substantially restricted to a single direction 16. The technique facilitates construction of high aspect ratio light emitters because fresnel lens 14 has a very low effective "f" number, due to its incorporation of a special combination of refraction and total internal reflection in the prismatic surfaces. Unfortunately, although the emitted light is highly directional, it is not distributed with high uniformity over the entire light emitting surface of fresnel lens 14. In particular, the intensity of the light output is very high at points on the light emitting surface near light source 12, and very much lower at points further from light source 12.

Figure 1B:
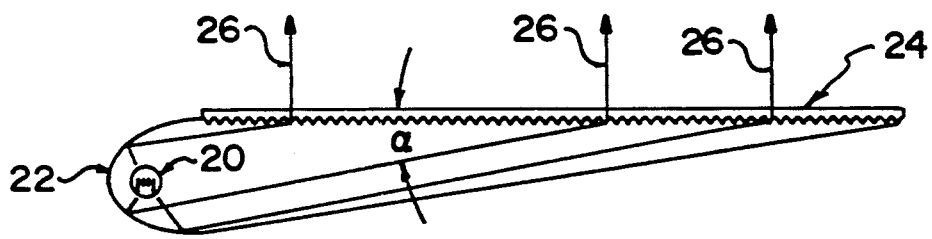

FIG. 1B shows another prior art approach as disclosed in U.S. Pat. Nos. 4,984,144 and 4,989,125 (Cobb, Jr. et al). Light emanating in arbitrary directions from light source 20 is substantially collimated by reflector 22, which directs the light at a glancing angle $\theta$ onto prismatic screen 24. Using a combination of refraction and total internal reflection, screen 24 redirects the light in such a way that the light emitted from screen 24 is substantially restricted to a single direction 26. This approach can achieve higher uniformity of light distribution over the entire light emitting surface of screen 24, particularly if the light emanating from reflector 22 is very well collimated. But, in many practical situations, reflector 22 cannot collimate the light sufficiently to achieve substantially uniform light distribution over the entire light emitting surface of screen 24.

Figure 1C:
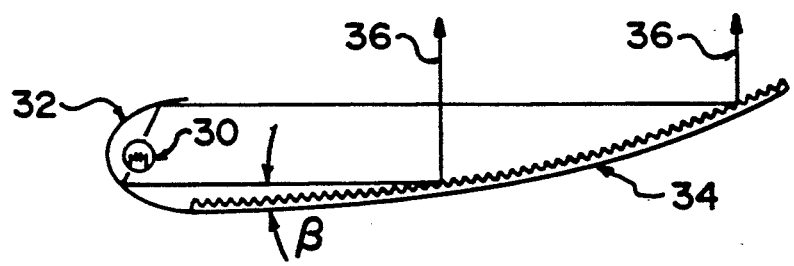

FIG. 1C shows another prior art approach as disclosed in U.S. Pat. No. 4,799,137 (Aho) and U.S. Pat. No. 4,874,228 (Aho et al). Light emanating in arbitrary directions from light source 30 is substantially collimated by reflector 32, which directs the light onto prismatic reflector 34. Light incident upon reflector 34 is reflected 90° away from the incident direction. Accordingly, the reflected light is substantially restricted to a single direction 36 which, within limits, is independent of the angle $\beta$ at which the incident light strikes reflector 34. By carefully selecting the shape of reflector 34, one may ensure that a greater fraction of the light per unit length is incident upon reflector 34 at distances farther from light source 30 than at distances closer to light source 30, and thus attempt to overcome the intrinsic decrease in brightness as distance from source 30 increases, so as to maintain substantially uniform light distribution over the entire light emitting surface of reflector 34. However, the effectiveness of this approach also depends upon the ability of reflector 32 to collimate the light. In most practical situations reflector 32 cannot collimate the light sufficiently to achieve substantially uniform light distribution over the entire light emitting surface of reflector 34.

Figure 2A:
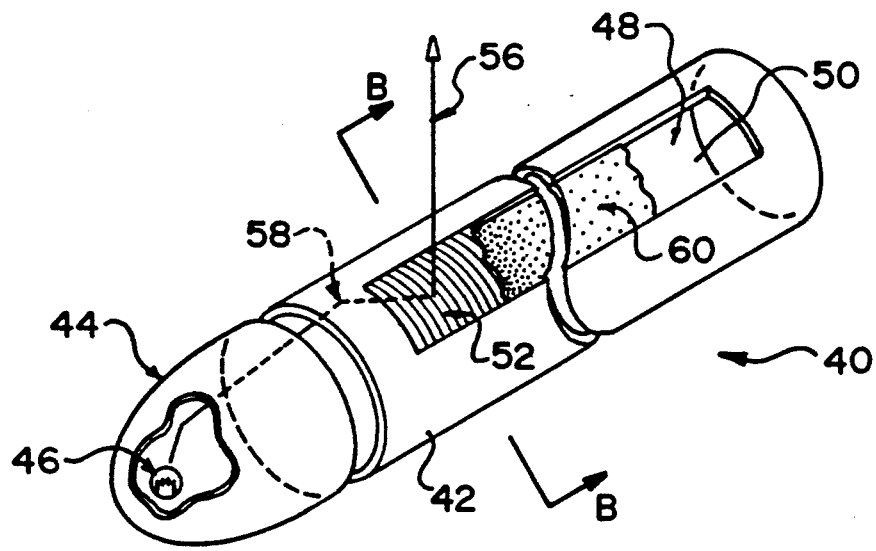
FIG. 2A is a partially fragmented pictorial illustration of a light emitter constructed in accordance with the preferred embodiment of the invention.
Figure 2B:
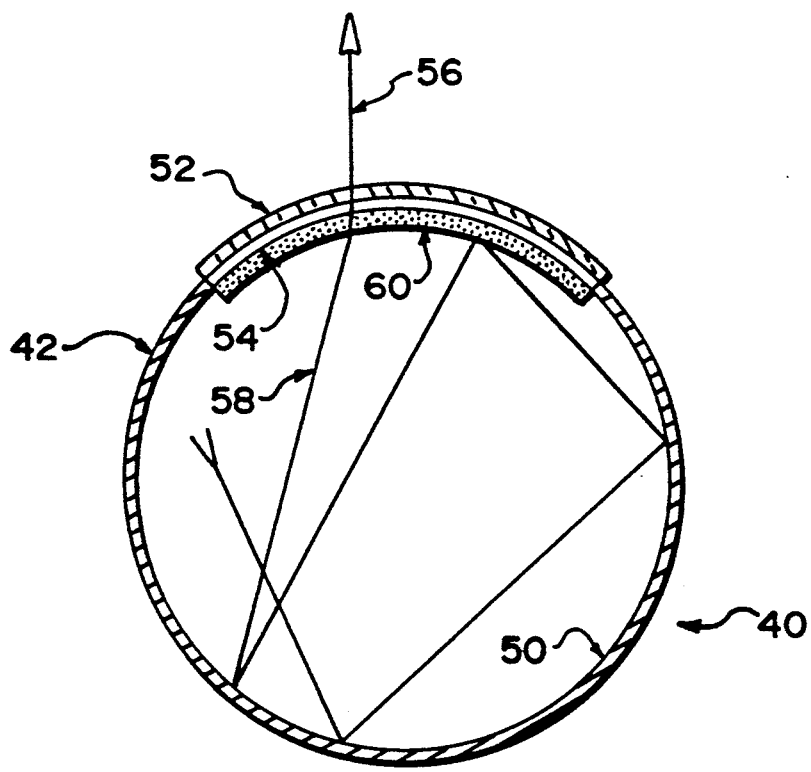
FIG. 2B is a cross-section illustration taken with respect to line B—B of FIG. 2A.

FIGS. 2A and 2B depict a light emitter 40 constructed in accordance with the preferred embodiment of the invention. Light emitter 40 takes the form of a hollow structure 42, having a length considerably greater than its minimum cross-sectional dimension. Reflector 44 partially collimates light emanating from light source 46 and directs the light into structure 42 in a direction approximately parallel to the longest dimension of structure 42. Light is emitted from structure 42 through light emitting area 48. Substantially all of the interior surface 50 of structure 42, apart from light emitting area 48, consists of or is lined with a longitudinally specular material, as hereinafter defined.

Figure 3:
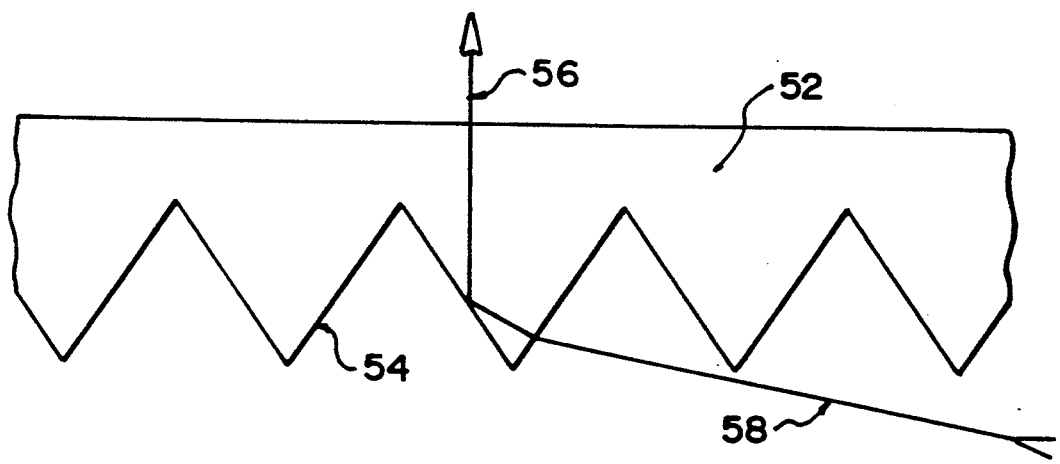
FIG. 3 is an enlarged cross-sectional illustration of the outer optical layer of the light emitting surface of the light emitter of FIGS. 2A and 2B, showing light emission in a restricted direction substantially perpendicular to the light emitting surface.
Figure 6:
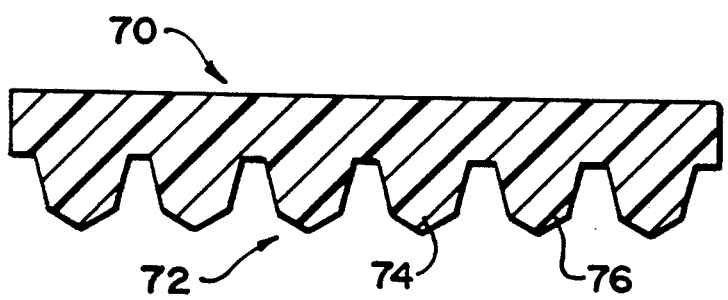
FIG. 6 is an alternate embodiment of the outer optical layer shown in FIG. 3.

Light emitting area 48 has a uniform outer optical layer 52 (FIGS. 2A, 2B and 3). Outer layer 52 is designed to efficiently transmit light which is both (i) incident upon the prismatic inner surface 54 of layer 52; and, (ii) nearly parallel to the longest dimension of structure 42; such that most of the light emitted through outer layer 52 travels predominantly in a selected direction 56. More particularly, as shown in FIG. 3, a light ray 58 which is nearly parallel to the longest dimension of structure 42 and incident upon inner surface 54 is subjected to both refraction and total internal reflection, resulting in the light being emitted from outer layer 52 in a restricted direction 56. An example of a material suitable for forming outer layer 52 is prismatic film of the type disclosed in U.S. Pat. No. 4,984,144 (Cobb, Jr. et al). Such film can be fabricated to have the property that the emitted light is restricted to a direction substantially perpendicular to the material's emitting surface. In particular, U.S. Pat. No. 4,984,144 discloses that, in one embodiment, such "light extraction film" may have a structured surface and a second surface, with a plurality of linear prisms on the structured surface, and with first and second sides of each prism making an angle in the range of 59° to 79° with one another. The →144 patent discloses another embodiment of such film (depicted in FIG. 6 hereof) in which a base layer 70 defines a plane having a structured surface 72, with linear prisms 74, 76 on the surface, and with each prism having only four planar sides extending from the plane. Two of the sides are adjacent to the plane, the projections of which meet at a relatively narrow angle; and, two of the sides are more distant from the plane and meet at a relatively wide angle.

Figure 5:
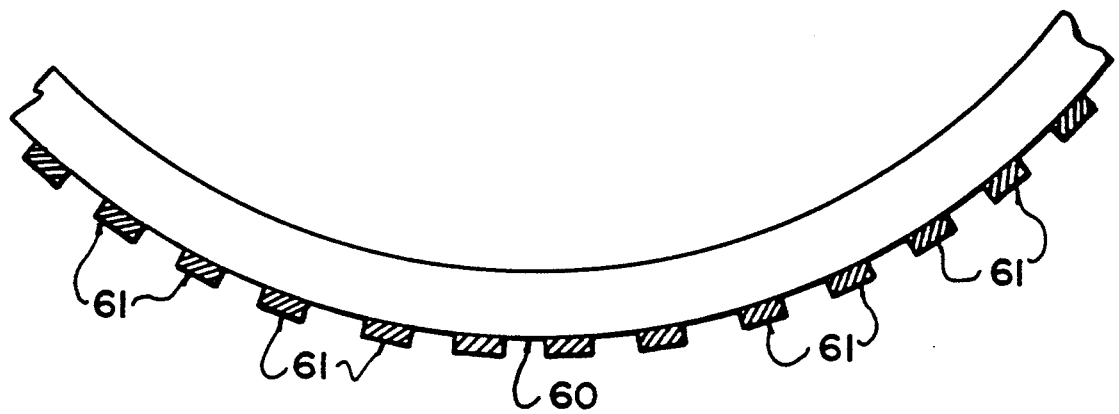
FIG. 5 is an enlarged cross-sectional illustration of part of the inner portion of the light emitting area of the light emitter of FIGS. 2 and 3, showing how a metal pattern can be applied thereto to control the escape of light through the inner portion.

Light emitting area 48 also has an inner optical layer 60, which is a partially longitudinally specular reflector and a partially longitudinally transparent light transmitter. As used herein, the term "longitudinally specular reflector" means a material for which the z components of the unit direction vectors of the incident and reflected light rays are substantially the same, where the z direction is parallel to the surface of the material, and is also the longest direction of structure 42. Similarly, the term "longitudinally transparent light transmitter" means a material for which the z components of the unit direction vectors of the incident and transmitted light rays are substantially the same. An example of a spatially variable, longitudinally specular reflective material which is also longitudinally transparent is a transparent substrate onto which a metallic film pattern is etched, such as VARALUME ™ material available from TIR Systems Ltd., of Burnaby, British Columbia, Canada. Another example is shown in FIG. 5, which depicts inner portion 60 bearing a thin aluminum film 61 which may be applied by vapor deposition. Portions of film 61 have been removed to leave a selected fine pattern on inner portion 60 which varies as a function of position, thereby varying the average light transmissivity through inner portion 60 as a function of position.

Inner layer 60 does not have uniform longitudinal transmissivity. That is, the fractional longitudinal light transmission through inner layer 60 is not uniform over the outer surface of inner layer 60, but changes such that the intensity of the transmitted light varies in a predetermined manner as a function of position on the outer surface of inner layer 60. In many cases, it is desirable to achieve uniform light emission at all points on the outer surface of inner layer 60. Generally, to achieve such uniform emission, the transmissivity of inner layer 60 is reduced at points on inner layer 60 near light source 46 (where the incident light is brightest), and increased at points further away from light source 46 (where the incident light is dimmer). Because the reflectivity of inner layer 60 is longitudinally specular, light reflected by inner layer 60 remains collimated. Because the transmissivity through inner layer 60 is longitudinally transparent, light transmitted through inner layer 60 also remains collimated. Outer layer 52 is thus able to direct such transmitted light in the desired direction 56, as described above.

Figure 4A:
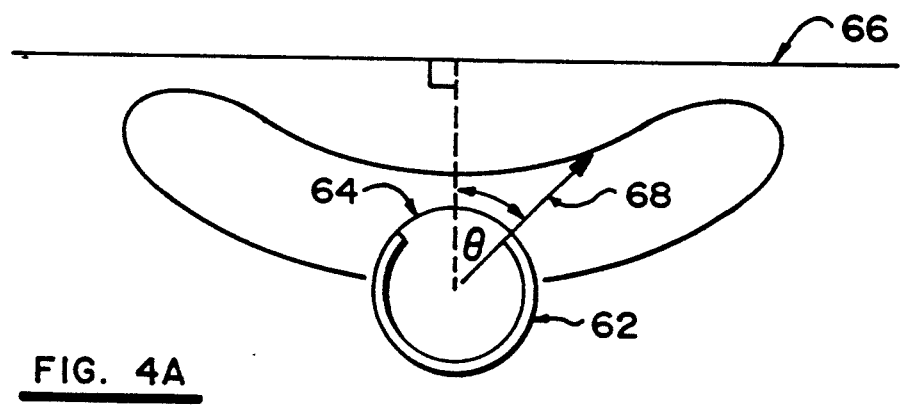
FIG. 4A is a graph of luminous intensity vs. angle for a light emitter designed to uniformly illuminate a plane surface close to the emitter. The graph is superimposed on a cross-sectional illustration of the light emitter.
Figure 4B:
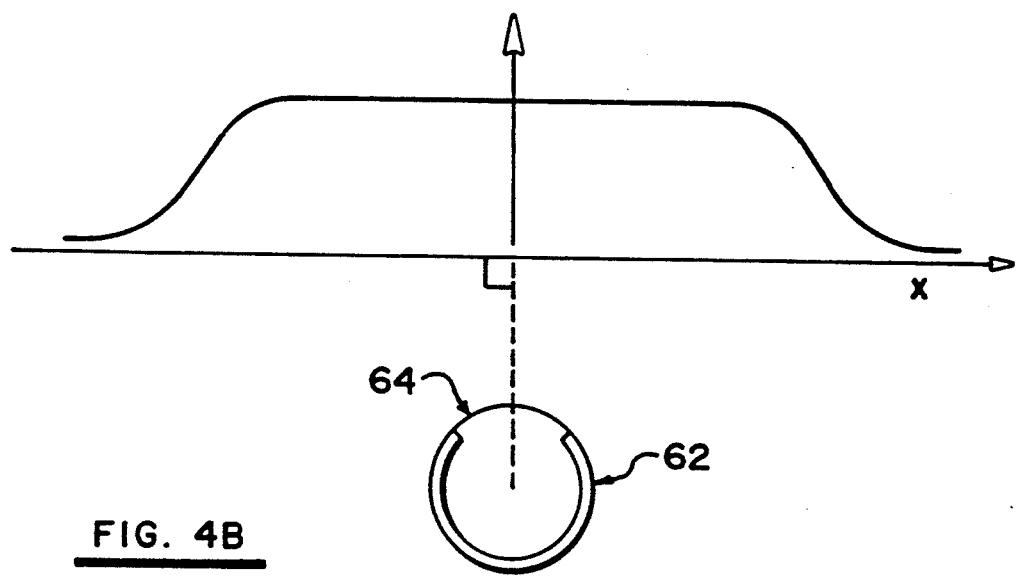
FIG. 4B is a graph of surface illuminance vs. position for the light emitter of FIG. 4A. The graph is superimposed on a cross-sectional illustration of the light emitter.

Light emitting area 48 is not necessarily flat. If the light emitting area is curved, directional control of light emission as a function of position also facilitates directional control of the total luminous intensity of structure 42 as a function of angle. FIG. 4A illustrates this capability in relation to a light emitter 62 having a curved light emitting area 64 designed to uniformly illuminate a plane surface 66 close to emitter 62. This is representative of indirect ceiling lighting applications. Superimposed on FIG. 4A is a polar coordinate graph in which the luminous intensity of light emitted through area 64 is plotted as the ordinate, versus the angle $\theta$ at which light is emitted from light emitting area 64. FIG. 4B superimposes a graph of illuminance on surface 66 versus position on that surface.

As FIG. 4A illustrates, the inner and outer portions of light emitting area 64 may be suitably configured so that the intensity of the emitted light is lower at smaller incident angles and increases at larger angles. FIG. 4B shows that the intensity of the resultant illumination is substantially uniform at all points on surface 66, irrespective of the distance between emitter 62 and any particular point on surface 66. Such uniform illumination can be attained if the inner and outer layers of light emitting area 64 are configured so that the total luminous intensity of the emitted light varies as $1/\cos^2\theta$ over a substantial angular range.

Reflective film of the type disclosed in U.S. Pat. No. 4,799,137 (Aho) has been used in light redirecting structures, as discussed in U.S. Pat. No. 4,984,144 (Cobb, Jr. et al). However, if the reflective film material occupies a substantial portion of the cross-sectional area of the structure, as is often necessary to achieve a large light emitting area, the structure cannot transmit light well because its interior surfaces are unable to provide sufficient longitudinally specular reflectivity. Without the present invention, such structures emit light in a poorly controlled fashion, with relatively high intensity light being emitted at points on the light emitting surface near the light source, and relatively low intensity light being emitted at points farther from the light source.

Generally, there are many uses for distributed light; that is, light which is emitted uniformly from long and/or wide, high aspect ratio structures. Besides having the desirable property of uniform light emission, high aspect ratio light emitters constructed in accordance with the invention have the additional property of emitting highly directional light. The direction of light emission may be varied to suit the particular application. As mentioned above, high directionality is a desired feature of linear navigational beacons, certain backlit liquid crystal displays, and certain vehicle signal lights. The invention also facilitates the use of a single, readily accessible light source (or a small number of such sources).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A hollow light emitter having a length considerably greater than its minimum cross-sectional dimension for receiving light from a partially collimated light source and emitting said light without substantial loss of collimation from a light emitting area of said emitter in one or more selected directions with substantially uniform light output per unit length along said light emitting area, said light emitter comprising:
   (a) a longitudinally specularly reflective internal surface;
   (b) said light emitting area comprising:
      (i) an inner portion which is:
         (1) substantially longitudinally specularly reflective; and,
         (2) longitudinally transmissive; and,
      (ii) a refractive, prismatic outer portion separated from said inner portion by a gap.

2. A light emitter as defined in claim 1, wherein the degree of longitudinal transmissivity of said inner portion varies as a selected function of position on said inner portion.

3. A light emitter as defined in claim 2, wherein said transmissivity varies such that the quantity of light per unit area transmitted by said inner portion has a predetermined distribution of values as a function of position on the outer surface of said inner portion.

4. A light emitter as defined in claim 3, wherein said quantity of light per unit area transmitted by said inner portion is substantially uniform.

5. A light emitter as defined in claim 2, wherein said light emitting area is curved.

6. A light emitter as defined in claim 5, wherein said transmissivity varies such that the total luminous intensity of said emitted light has a predetermined distribution of values as a function of the direction of emission of said light.

7. A light emitter as defined in claim 6, wherein said total luminous intensity of said emitted light is substantially uniform.

8. A light emitter as defined in claim 6, wherein said total luminous intensity of said emitted light is substantially uniform within a selected directional range, and substantially zero outside said range.

9. A light emitter as defined in claim 6, wherein said transmissivity is varied such that the luminous intensity of said emitted light varies as $1/\cos^2\theta$ over a selected range of $\theta$, where $\theta$ is an angle measured relative to a preselected direction of emission.

10. A light emitter as defined in any one of claims 1 through 9, wherein light incident at any particular point on said outer portion is redirected into a direction substantially perpendicular to said outer portion at said point.

11. A light emitter as defined in any one of claims 1 through 9, wherein said outer portion transmits incident, collimated light in said selected direction with little or no loss of collimation.

12. A light emitter as defined in any one of claims 1 through 9, wherein said outer portion comprises transparent light extraction film having a structured surface and a second surface, said structured surface having a plurality of linear prisms thereon, each of said prisms having first and second sides, said first and second sides making an angle in the range of 59° to 79° with one another.

13. A light emitter as defined in any one of claims 1 through 9, wherein said inner portion comprises a transparent substrate bearing a metal pattern which varies as a selected function of position on said inner portion.

14. A light emitter as defined in any one of claims 1 through 9, wherein said outer portion comprises transparent light extraction film having a base layer defining a plane and having a structured surface, said surface having linear prisms thereon, each of said prisms having only four planar sides extending from said plane, two of said sides being adjacent said plane, the projections of which meet at a relatively narrow angle and two of said sides being more distant from said plane which meet at a relatively wide angle.

* * * * *

UNITED STATES PATENT AND TRADEMARK OFFICE
CERTIFICATE OF CORRECTION

Page 1 of 2

PATENT NO. : 5,243,506
DATED : September 7, 1993
INVENTOR(S) : Lorne A. Whitehead It is certified that error appears in the above-indentified patent and that said Letters Patent is hereby corrected as shown below:

Title page, item [56],
Please add the following prior art references:

| Ref. | Patent No. | Date | Name/Country |
|------|-----------|----------|----------------------|
| AA | 4,105,293 | 08/08/78 | Aizenberg, et al./U.S. |
| AB | 4,260,220 | 04/07/81 | Whitehead/U.S. |
| AC | 4,337,759 | 07/06/82 | Popovich, et al./U.S. |
| AD | 4,615,579 | 10/07/86 | Whitehead/U.S. |
| AE | 4,755,921 | 07/05/88 | Nelson/U.S. |
| AF | 4,787,708 | 11/29/88 | Whitehead/U.S. |
| AG | 4,799,137 | 01/17/89 | Aho/U.S. |
| AH | 4,805,984 | 02/21/89 | Cobb, Jr./U.S. |
| AI | 4,834,495 | 05/30/89 | Whitehead, et al./U.S. |
| AJ | 4,850,665 | 07/25/89 | Whitehead/U.S. |
| AK | 4,874,228 | 10/17/89 | Aho, et al./U.S. |
| AL | 4,906,070 | 03/06/90 | Cobb, Jr./U.S. |
| AM | 4,937,716 | 06/26/90 | Whitehead/U.S. |
| AN | 4,984,144 | 01/08/91 | Cobb, Jr., et al./U.S. |
| AO | 4,989,125 | 01/29/91 | Cobb, Jr., et al./U.S. |

UNITED STATES PATENT AND TRADEMARK OFFICE
CERTIFICATE OF CORRECTION

PATENT NO. : 5,243,506
DATED : September 7, 1993
INVENTOR(S) : Lorne A. Whitehead It is certified that error appears in the above-indentified patent and that said Letters Patent is hereby corrected as shown below:

| AP | 2196100A   | 04/20/88 | Ohe/GreatBritain |
| AQ | 0167721    | 01/15/86 | Masuzawa/EP |
| AR | WO 90/04132 | 04/19/90 | Aikens/PCT |

Signed and Sealed this

Nineteenth Day of July, 1994

Attest:

BRUCE LEHMAN

*Attesting Officer*     *Commissioner of Patents and Trademarks*